United States Patent [19]
Fowler

[11] 3,959,956
[45] June 1, 1976

[54] COTTON HARVESTING MACHINE

[76] Inventor: Lambuth G. Fowler, 2506 46th St., Lubbock, Tex. 79417

[22] Filed: Sept. 27, 1974

[21] Appl. No.: 509,788

[52] U.S. Cl. .................................. 56/30; 209/119
[51] Int. Cl.² .................................... A01D 46/10
[58] Field of Search .................... 56/30; 209/119

[56] References Cited
UNITED STATES PATENTS

| | | | |
|---|---|---|---|
| 2,645,821 | 7/1953 | Fowler | 209/137 |
| 2,820,989 | 1/1958 | Bopf | 56/30 X |
| 3,227,274 | 1/1966 | Fowler | 209/119 |
| 3,397,522 | 8/1968 | Sanderson et al. | 56/30 |
| 3,485,019 | 12/1969 | Gable, Jr. et al. | 56/30 |
| 3,566,591 | 3/1971 | Blanton et al. | 56/30 |

*Primary Examiner*—Russell R. Kinsey
*Assistant Examiner*—Daniel J. Leach

[57] ABSTRACT

A cotton harvesting machine in which the cotton as stripped from the rows is fed from the strippers into a rotary screw or auger device from which it is blown by a high velocity primary air stream from a high speed rotary fan through a venturi throat into the main cotton discharge duct while, at the same time, the high speed rotary fan directs a high velocity secondary or auxiliary air stream through a combination separating chamber and auxiliary discharge duct into the main outlet or cotton discharge duct. A discharge outlet is provided at the bottom of the combination separation chamber and auxiliary or secondary discharge duct and green or unopened cotton bolls and foreign matter including sticks, stones, etc., are discharged from the combination separation chamber and auxiliary or secondary discharge duct onto the ground and are prevented from being blown into the main cotton discharge outlet or duct and thence into the trailer wagon from which they would be delivered to the cotton gin where they would do great damage to the cotton gin apparatus.

2 Claims, 7 Drawing Figures

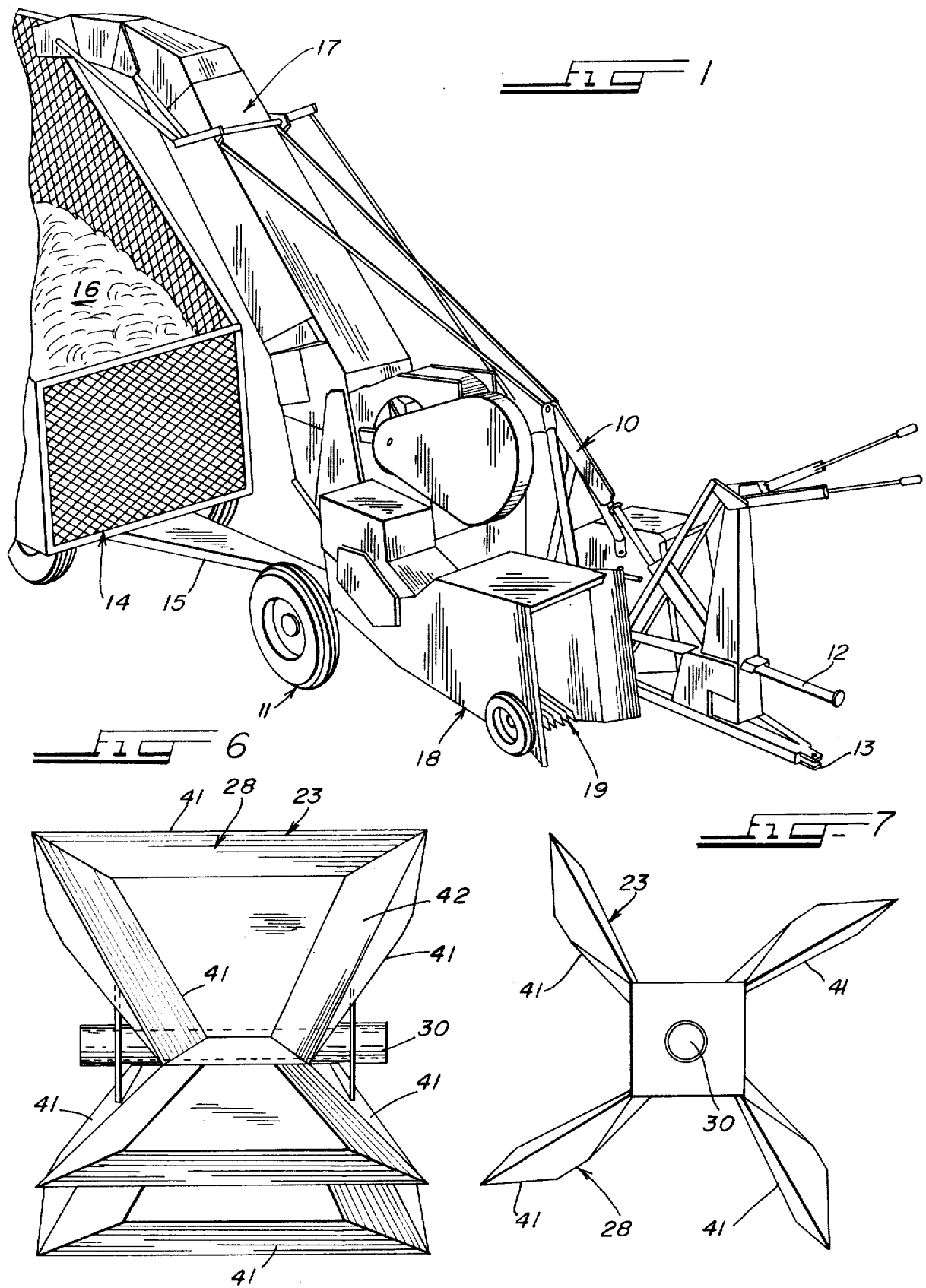

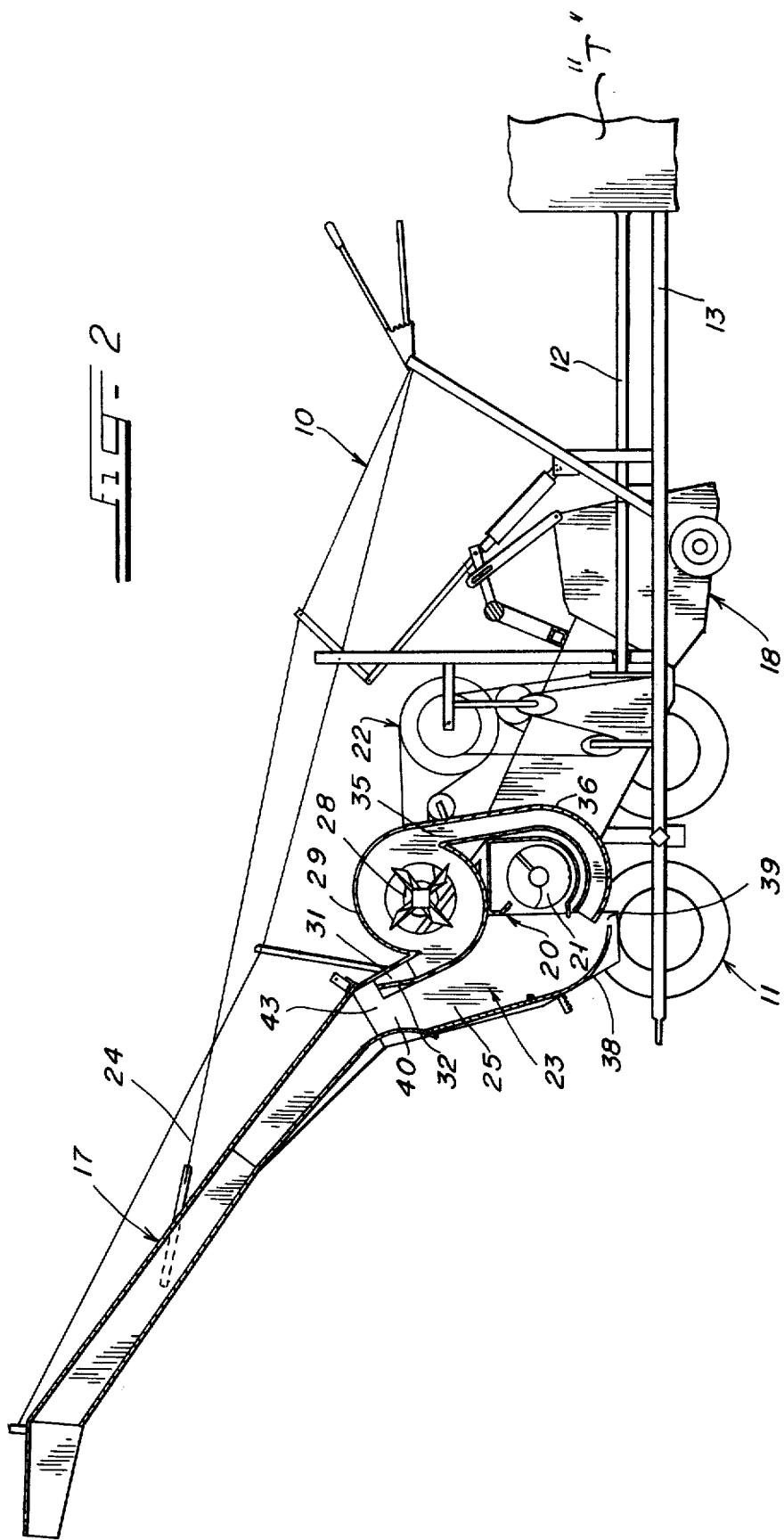

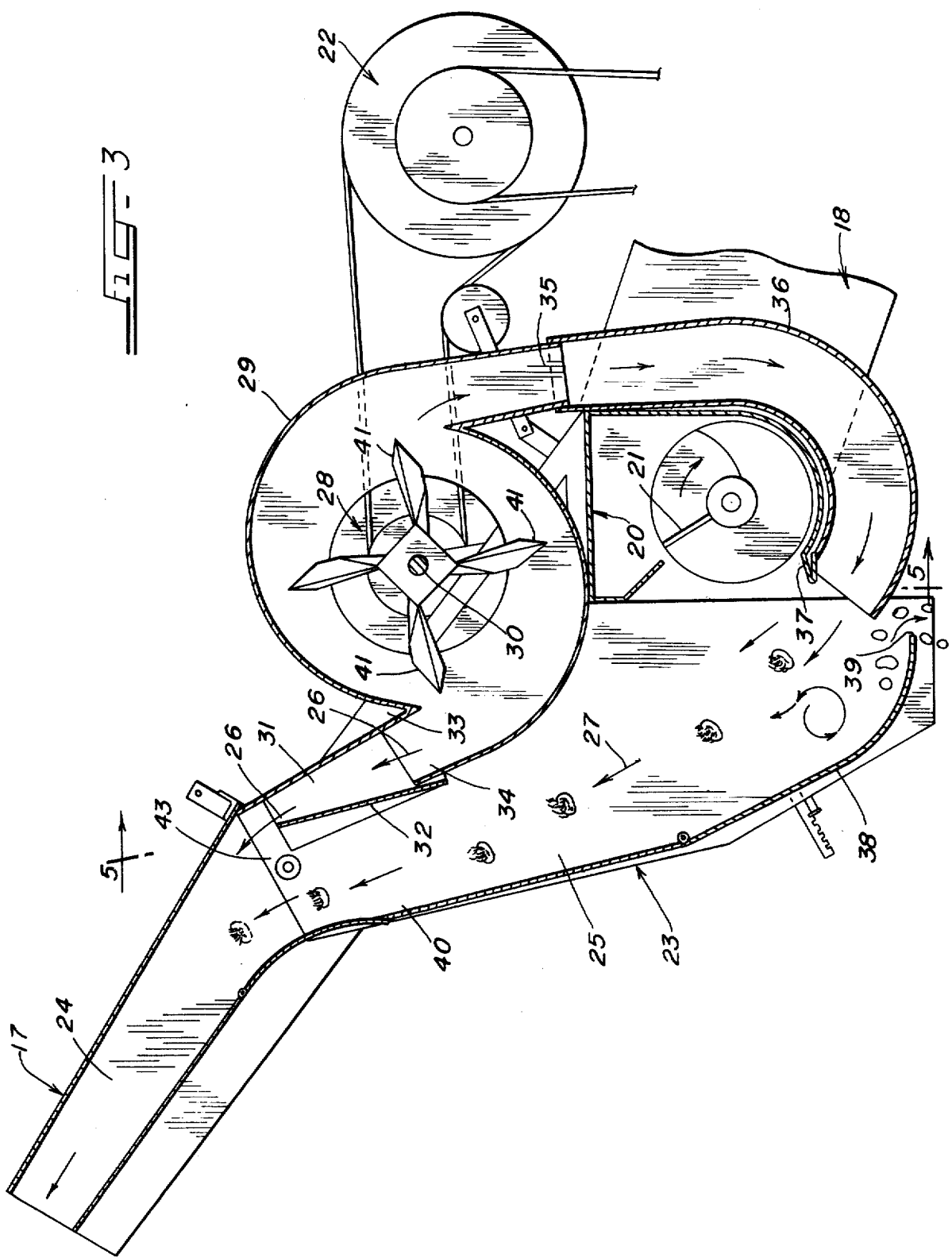

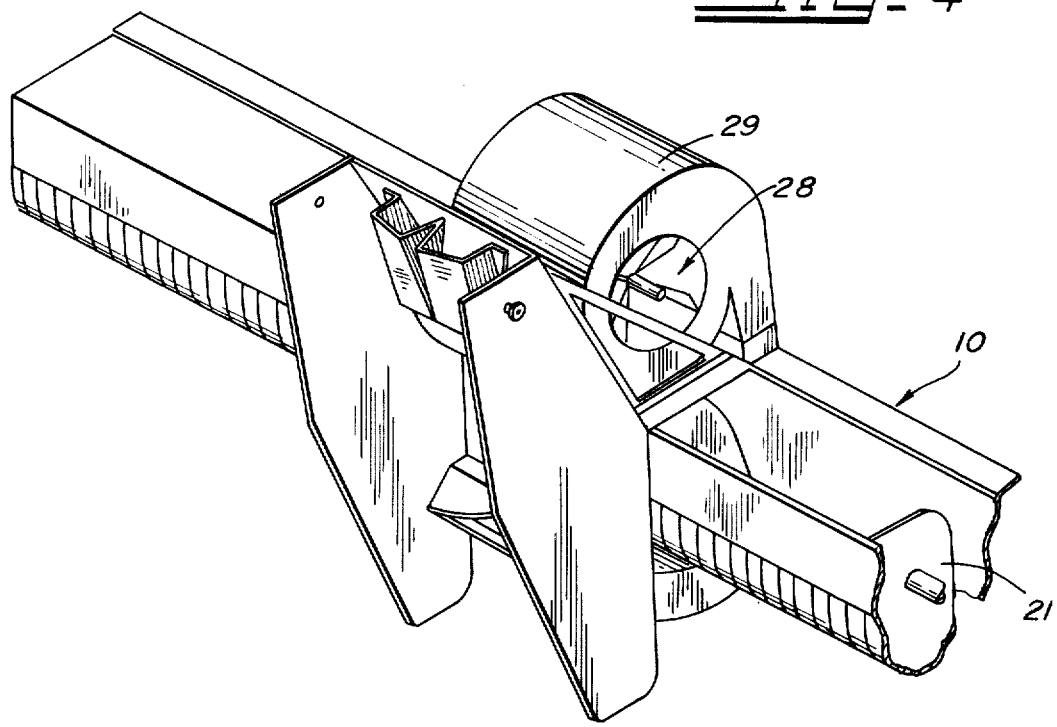
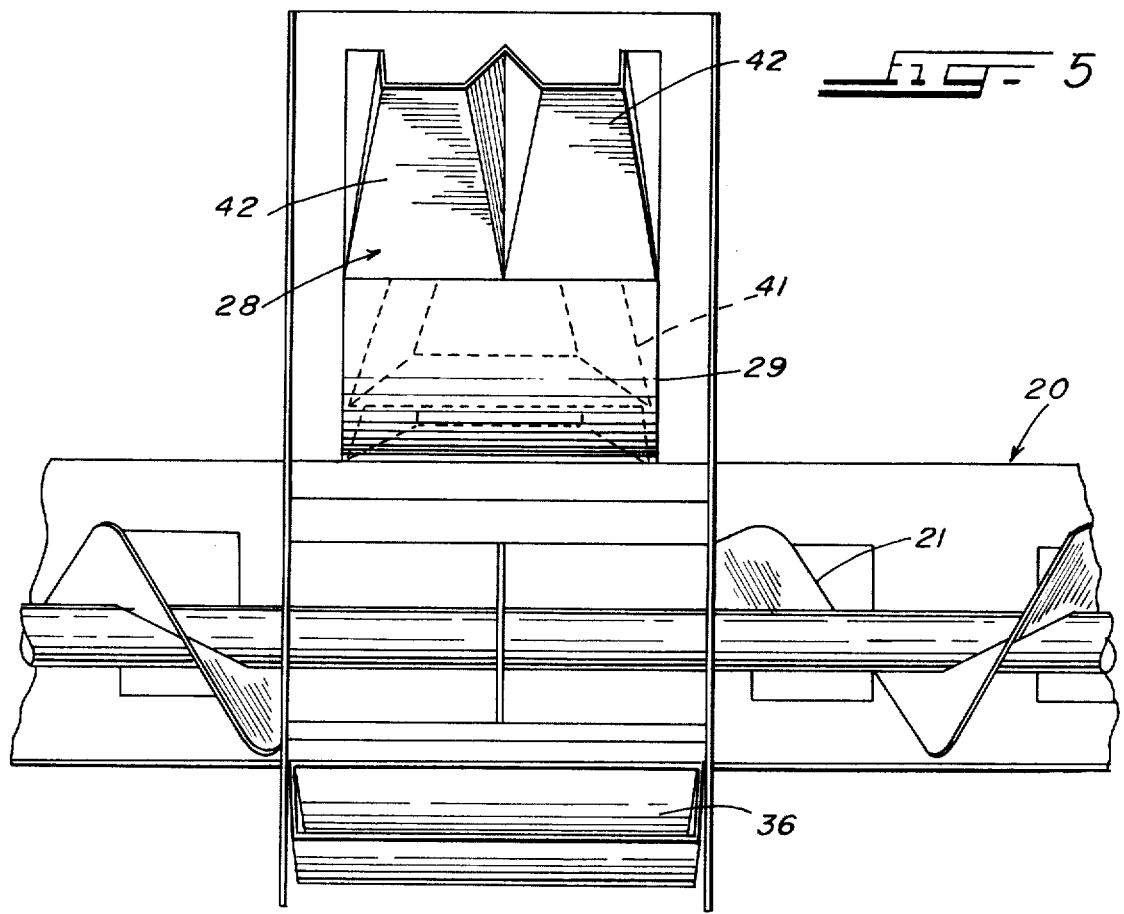

COTTON HARVESTING MACHINE

BACKGROUND OF THE INVENTION

The present invention is in the nature of an improvement over the prior art as represented by applicant's prior U.S. Pat. No. 2,645,821, granted July 21, 1953 and U.S. Pat. No. 3,227,274, granted June 4, 1966.

OBJECTS

An object of the invention is to provide a new and improved cotton harvesting apparatus which effectively prevents green or unopened cotton bolls, sticks and stones, and like foreign matter from being discharged into the main cotton discharge outlet or discharge duct by which the cotton is delivered to the trailer wagon, or over head basket and discharges such green or unopened cotton bolls, sticks and stones, etc., onto the ground as the harvesting machine is in operation.

An additional object of the invention is to provide a new and improved cotton harvesting machine which embodies a novel combination of a main or primary high velocity air duct and a secondary or auxiliary high velocity air duct for blowing the cotton into the trailer wagon while, at the same time, effectively eliminating green cotton bolls, stick and stones, and like foreign materials from the cotton prior to the time the cotton enters the main discharge outlet or duct and is blown therefrom into the trailer wagon or basket.

Other objects will appear hereinafter.

DESCRIPTION OF FIGURES IN THE DRAWINGS

FIG. 1 is a front perspective view of a cotton harvesting apparatus embodying the present invention;

FIG. 2 is a side elevational view of the new cotton harvesting apparatus as seen from the right hand side in FIG. 1;

FIG. 3 is a fragmentary vertical sectional view of parts of the new cotton harvesting apparatus shown in FIGS. 1 and 2 and illustrating the movements of the primary and secondary or auxiliary high velocity air streams which are created in the use of the new cotton harvesting apparatus;

FIG. 4 is a fragmentary front perspective view of the fan housing and auger which are embodied in the new cotton harvesting apparatus as shown in FIGS. 1 and 3, inclusive;

FIG. 5 is a vertical sectional view on line 5—5 in FIG. 3;

FIG. 6 is a front elevational view of the high speed air fan embodied in the invention; and FIG. 7 is a side elevational view of the high speed air fan shown in FIG. 6.

DETAILED DESCRIPTION OF THE FIGURES IN THE DRAWINGS

A cotton harvesting apparatus embodying the present invention is illustrated in the drawings, wherein it is generally indicated at 10, and includes a wheel-bearing supporting frame 11, and a power take-off 12 which is driven by a tractor "T" (FIG. 2) attached to a tractor hitch 13. A cotton trailer wagon 14 is attached, as at 15, to the cotton harvesting unit 10, and the cotton 16 is blown or discharged into the trailer wagon 14 by the main cotton discharge or outlet duct 17.

The cotton harvesting apparatus 10 includes a pair of laterally spaced wheel-bearing cotton stripper units 18 each of which has a plurality of spaced stripper tines 19 arranged therein for stripping the cotton from the rows of cotton, as is well understood in the art.

The cotton harvesting apparatus 10 includes a transversely extending housing 20 in which a horizontally extending feed screw or auger 21 is rotatably mounted (FIGS. 3 and 5) and is driven by suitable conventional power transmission means (not shown).

The cotton harvesting apparatus 10 includes other parts and devices which are well understood in the art and hence need not be described in detail herein.

The present invention is shown particularly in FIGS. 2, 3, 5, 6 and 7, wherein it is generally indicated at 23, and comprises a main cotton outlet or discharge duct 24 into which the cotton is blown from a lower combination separation chamber and auxiliary or secondary high velocity air duct 25 by means of the combination of a main and primary high velocity air stream, indicated by the arrows 26, and a secondary or auxiliary high velocity air stream indicated by the arrows 27 (FIG. 3).

The present invention includes a high speed air fan 28 which is driven by the belt and pulley power transmission system 22, and this high speed fan 28 is rotatably mounted, as at 30, in a fan housing 29. The high speed air fan 28 directs a part 26 of the high velocity air stream from the fan housing 29 into a Venturi passage 31 which is provided by a generally conical-shaped member 32 which is attached, as at 33, to the outlet end portion 34 of the fan housing 29 (FIGS. 2 and 3).

The present invention also includes a high velocity air supply duct or passage 35 and this high velocty air supply or passage 35 has a lower end portion 36 from which a high velocity air stream is directed into the combination separation chamber and secondary or auxiliary high velocity air duct 25.

The combination separation chamber and auxiliary or secondary high velocity air duct 25 has a lower end portion 38 which is provided at the bottom thereof with a discharge outlet 39 and the upper end portion of the combination separation chamber and high velocity secondary or auxiliary air duct 25 has a constricted throat portion which provides a second Venturi 40, where it merges into the main cotton discharge outlet or duct 17-24.

The high speed air fan 28 includes a plurality (shown as four) of air blades 41 which are spaced radially at 90° intervals on the supporting shaft 30, and each of the fan blades 41 is cup-shaped on its inner surface, as at 42 (FIG. 5) to increase the effectiveness thereof.

OPERATION

In the use of the present invention 23 in a cotton harvesting machine 10, when the cotton harvesting machine 10 is hitched to a tractor, as at 12 and 13, and power is supplied to the belt and pulley power transmission system 22, the cotton is picked up by the stripper units 18 and stripper tines 19, and is fed from the stripper units 18 into the auger or screw housing 20 by which it is delivered by the auger or screw 21 through the open lower end portion 37 of the auger or screw housing 20 into the auxiliary or secondary high velocity air duct and combination separation chamber 38-25-40 from which it is driven upwardly by the high velocity air stream 27, from the high velocity air supply duct 35-36, through the Venturi-like throat 40 thereof into the main cotton discharge outlet or duct 24 by which the cotton 16 is directed into the trailer wagon 14.

As the cotton is blown upwardly in the high velocity auxiliary or secondary air duct and separation chamber 38-25-40 by the auxiliary or secondary high velocity air stream 27 the force of the auxiliary or secondary high velocity air stream 27 creates a whirling action in the combination separation chamber and auxiliary or secondary high velocity air duct 38-25-40 but this auxiliary or secondary high velocity air stream 27 is insufficient of itself to effectively drive or blow all of the cotton upwardly into and out of the main cotton outlet or air discharge duct 24-17. However, as the auxiliary or secondary high velocity air stream 27 merges into the main high velocity air stream 26 at the confluence or junction 43 of the auxiliary or secondary high velocity air stream 27 and the main high velocity air stream 26, the combined force of the primary high velocity air stream 26 and the Venturi action created therein by the Venturi throat 31-32 causes the combined two high velocity air streams 26 and 27 effectively to blow or discharge the cotton into the main cotton discharge outlet or duct 24-17 from which it is blown into the trailer wagon 14.

At the same time, the high velocity auxiliary or secondary air stream 27, being insufficient to force the entire load of cotton up into and out of the main discharge outlet or duct 24-17 is also insufficient to blow green or unopened cotton bolls and other foreign matter, including sticks and stones, up into and out of the main air discharge duct 24-17, with the result that the green or unopened cotton bolls, and other foreign matter, including sticks and stones, etc., which may be picked up by the cotton strippers 18, and fed into the auger or screw housing 20, and thence into the auxiliary or secondary high speed air duct and separation chamber 38-25-40, drop downwardly and fall by gravity therefrom through the discharge outlet 39 to the ground, thereby eliminating, sticks and stones, and other foreign materials, while at the same time, preventing the green cotton bolls from later getting into the working parts of the cotton gin where, as is well known in the art, they would do extensive damage.

It will thus be noted that in use the high velocity air stream created by the high speed fan 28-41 is directed, in part, from the fan housing 28 into the primary high velocity air stream duct 31-32-36 and thence into the main cotton discharge outlet or duct 24-17 while, at the same time, part of the high velocity air stream created by the high speed air fan 28-41 is discharged from the fan housing 29 by way of the auxiliary high speed air supply duct 35-36 into the combination separation chamber and high velocity air duct 38-25-40, with the advantageous result discussed above.

It will thus be seen from the foregoing description, considered in conjunction with the accompanying drawings, that the present invention provides a new and improved cotton harvesting machine having the desirable advantages and characteristics and accomplishing its intended objects including those hereinbefore pointed out and other which are inherent in the invention.

I claim:
1. A cotton harvesting machine comprising
   a. a wheel bearing supporting frame embodying
      1. a cotton stripping unit;
   2. a main cotton discharging outlet duct for discharging cotton from the machine into a pick-up or loader wagon and including
      a. an upper and outlet end portion; and
      b. a downwardly extending lower end portion;
   3. a first and primary high velocity air stream duct for discharging a first and primary high velocity air stream upwardly into the said lower end portion of the said main cotton discharging outlet duct and including a lower end portion;
   4. a fan housing including a body having a portion opening upwardly into and having communication with the said lower end portion of the said first and primary high velocity air stream duct and including a downwardly extending portion opening downwardly from said body of the said fan housing;
   5. a combination separation chamber and auxiliary high velocity air stream duct having
      a. an upwardly extending portion extending upwardly and having communication with the said lower end portion of the said main cotton discharge outlet duct; and including
         1. a downwardly extending lower end portion;
   6. an auxiliary high velocity air stream duct including an upper end portion having communication with the said downwardly extending portion of the said body of the said fan housing and including a lower end portion having communication with the said downwardly extending lower end portion of the said combination separation chamber and auxiliary high velocity air duct for discharging an auxiliary high velocity air stream into the said combination separation chamber and auxiliary high velocity air duct;
   7. a high velocity fan rotatably mounted in the said fan housing for creating a high velocity air stream therein for discharge in part into the said first and primary high velocity air stream duct through the said lower end portion thereof and in part downwardly through the said auxiliary high velocity air stream duct into the said combination separation chamber and auxiliary high velocity air stream duct and thence into the said lower end portion of the said main cotton discharge outlet duct;
   8. means for conveying cotton from the said stripper units into the said combination separation chamber and auxiliary or secondary high velocity air stream duct; and
   9. means for rotating the said high velocity air fan.
2. Cotton harvesting machine as defined in claim 1 in which
   a. the said first and primary high velocity air stream duct has
      1. a Venturi-shaped upper end portion having communication with the said downwardly extending open lower end portion of the said cotton discharge outlet duct; and in which
   b. the said combination separation chamber and auxiliary high velocity air stream duct has
      1. a Venturi-shaped upper end portion having communication with the said open lower end portion of the said main cotton discharge outlet duct.

* * * * *